United States Patent
Frey

(10) Patent No.: US 8,335,093 B2
(45) Date of Patent: Dec. 18, 2012

(54) POWER SUPPLY ARRANGEMENT WITH OUTPUT FLOW MONITORING

(75) Inventor: Fritz Frey, Kunzelsau (DE)

(73) Assignee: Stahl Schaltergate GmbH (DE)

( * ) Notice: Subject to any disclaimer, the term of this patent is extended or adjusted under 35 U.S.C. 154(b) by 229 days.

(21) Appl. No.: 12/745,848

(22) PCT Filed: Nov. 14, 2008

(86) PCT No.: PCT/EP2008/009641
§ 371 (c)(1), (2), (4) Date: Aug. 6, 2010

(87) PCT Pub. No.: WO2009/071171
PCT Pub. Date: Jun. 11, 2009

(65) Prior Publication Data
US 2010/0295526 A1 Nov. 25, 2010

(30) Foreign Application Priority Data
Dec. 4, 2007 (DE) .......................... 10 2007 058 614

(51) Int. Cl.
*H02M 3/335* (2006.01)
*H02H 7/122* (2006.01)

(52) U.S. Cl. ................ 363/21.13; 363/56.07; 363/56.08

(58) Field of Classification Search .................... 363/20, 363/21.01, 21.04–21.05, 21.12–21.13, 21.16, 363/56.08, 56.11–56.12, 109
See application file for complete search history.

(56) References Cited

U.S. PATENT DOCUMENTS

| | | | | |
|---|---|---|---|---|
| 4,843,535 A | * | 6/1989 | Fuchs | 363/71 |
| 4,885,673 A | * | 12/1989 | Philippe | 363/21.05 |
| 5,019,955 A | * | 5/1991 | Hoeksma | 363/21.07 |
| 5,036,450 A | * | 7/1991 | Kelleher et al. | 363/26 |
| 2002/0093839 A1 | * | 7/2002 | Bailly | 363/95 |
| 2006/0013020 A1 | | 1/2006 | Aso | |

FOREIGN PATENT DOCUMENTS

| | | |
|---|---|---|
| EP | 1255347 A2 | 11/2002 |
| JP | 07245874 | 3/1994 |
| WO | PCT/US00/23888 A1 | 3/2001 |
| WO | PCT/SE02/00136 A1 | 8/2002 |

* cited by examiner

*Primary Examiner* — Bao Q Vu
*Assistant Examiner* — Henry Lee, III
(74) *Attorney, Agent, or Firm* — Leydig, Voit & Mayer, Ltd.

(57) ABSTRACT

According to the invention, a blocking oscillator type converter circuit functions with a transformator that only comprises a primary winding and a secondary winding. Said transformator does not comprise a return coupling winding for the blocking oscillator. The control voltage of the oscillator is derived from the primary voltage of the transformator during the free-wheeling phase. The invention also relates to a voltage monitoring circuit that works independently from the oscillator, the output voltage of the oscillator being repressed when the voltage on the output of the blocking oscillator is too high. A flow monitoring circuit functions independently from the oscillator and the voltage monitoring circuit and suppresses the impulses for the power transistor when the power on the output side exceeds a predetermined measurement.

13 Claims, 1 Drawing Sheet

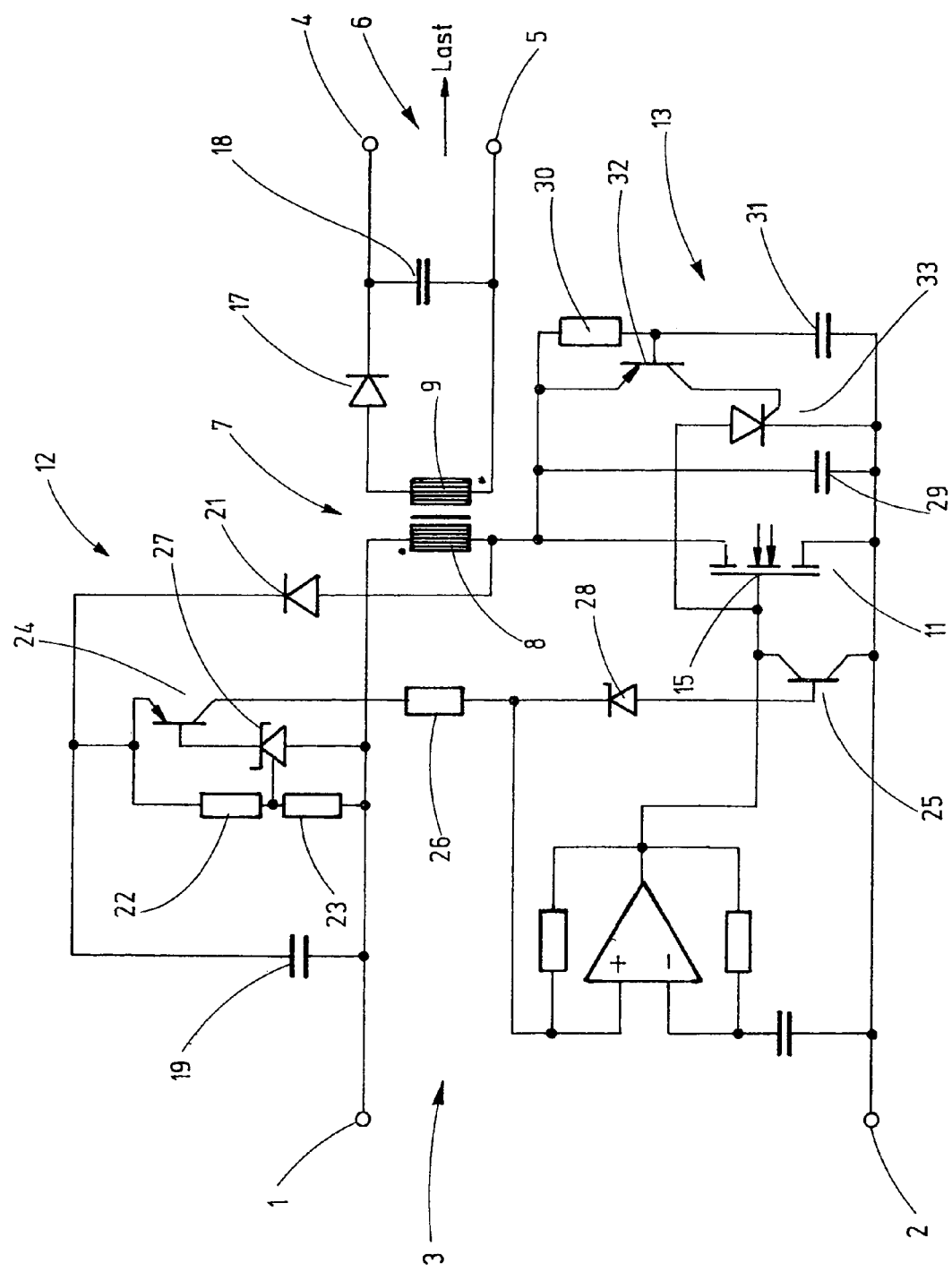

POWER SUPPLY ARRANGEMENT WITH OUTPUT FLOW MONITORING

CROSS-REFERENCE TO RELATED APPLICATIONS

This patent application is the national phase of PCT/EP2008/009641, filed Nov. 14, 2008, which claims the benefit of German Patent Application No. 102007058614.2, filed Dec. 4, 2007.

FIELD OF THE INVENTION

The present invention relates generally to electrical power management, and more particularly to an electrical power supply with output flow monitoring.

BACKGROUND OF THE INVENTION

In it increasingly important in electrical systems increase safety by providing additional redundancy. This is especially true in areas that pose a risk of explosion. In these areas, dangerous operating situations should be avoided as much as possible.

With respect to the risk of explosions, dangerous conditions can occur when electrical currents and/or voltages that can generate an ignition spark appear on the lines leading into a dangerous zone. In addition, at appropriate power levels, there is also the risk that components can reach surface temperatures that can ignite an ignitable mixture. Both risks are increasing due to the increase in electrical loads, e.g., modern bus systems, that draw large levels of current.

With this in mind, attention is placed on the power-supply devices and arrangements, so as to guarantee that, in addition to normally provided controls, there are mechanisms in place to rule out dangerous conditions even when an error occurs in the standard control loops. From the prior art, power-supply devices are known that operate according to the principle of a blocking-oscillator-type converter principle or a feed forward converter. These circuits use transformers with windings featuring galvanic separation and are used to increase or decrease the output voltage relative to the input voltage. These converter circuits contain reaction-coupling mechanisms in order to control the current and/or voltage on the secondary side.

The converter circuits contain, on the primary side, at least one controlled semiconductor switch in series with the primary winding of the transformer, in order to generate the corresponding alternating current.

Within this context, the problem of the invention is to create a power-supply arrangement with galvanic isolation, wherein this arrangement features increased safety.

OBJECTS AND SUMMARY OF THE INVENTION

According to one aspect of the invention, this problem is solved with a power-supply arrangement with the features of Claim 1. According to the invention, a power-supply arrangement with galvanic isolation is created that is suitable for limiting the current on the secondary side. In this regard, a circuit variant is used in which the current flowing on the secondary side is detected indirectly by the relationships on the primary side. In the discharging process, the energy containing inductance is proportional to the current for a constant supply voltage as long as the saturation limit is not reached. Furthermore, by neglecting the control inductance, the current on the primary side is proportional to the current on the secondary side, so that, in the switched-off state, the voltage on the primary side is proportional to the current on the secondary side.

The novel power-supply arrangement with galvanic isolation, in particular, in the explosion-proof construction, has a power-supply input. A series circuit made from the primary winding of a transformer and a controlled semiconductor lies parallel to the power-supply input. The primary winding of the transformer is galvanically isolated from the secondary winding.

A controllable control circuit that delivers a periodic control signal for the semiconductor switch is allocated to the semiconductor switch, such that the output voltage or the current through this circuit is constant. A current limiting circuit is provided parallel to the semiconductor switch, and contains a capacitor lying parallel to the semiconductor switch. The capacitor likewise lies in series to the primary winding. A voltage monitoring circuit lies on the input side, in order to generate an output signal that acts on the switch state of the semiconductor switch such that the semiconductor switch is transitioned into the blocking state when the voltage on the capacitor exceeds a predetermined limiting value.

In this regard, use is made of the fact that, after turning off the semiconductor switch, a free-running current flows that is, essentially, a mapping of the relationships on the secondary side.

Thus, the current on the secondary side can be limited without additional current sensors, whose sensor signal is transmitted in a galvanically isolated way to the primary side of the transformer, being implemented on the secondary side.

The measurement of the current on the secondary side is thus performed indirectly by means of a voltage measurement, which has the result that the arrangement features very low-power operation. Problems of temperature increase or internal resistance are thus avoided.

According to the application, the number of turns of the secondary winding can be greater than or less than the number of turns of the primary winding.

The controlled semiconductor switch can be formed by a MOSFET, for example, by a dual-gate MOSFET, so that the control is decoupled with high impedance by the current limiting from the control input for clocking the MOSFET.

The controllable control circuit for generating the required clock signal can be formed by an astable multivibrator. The pulse cycle of the astable multivibrator is varied in the sense of a constant-current or constant-voltage regulator. This pulse cycle regulation can be realized at a constant clock frequency or with the help of a variable clock frequency, when the switched-on period is fixed.

In one aspect of the invention, the current limiting circuit can also contain a low-pass filter in the voltage monitoring region, wherein this low-pass filter smoothes the signal applied at the series capacitor to the primary winding, in order to create a corresponding control signal for the voltage monitoring circuit.

In a further aspect of the invention, the current monitoring circuit can contain a transistor, as well as a self-locking semiconductor switch element, for example, a thyristor that is controlled by means of the transistor. The operating section of the thyristor lies parallel to a control section of the control track semiconductor switch.

In an aspect of the invention, it is advantageous if the arrangement works according to the principle of a blocking-oscillator-type converter. A half-wave rectifier circuit with a filter capacitor may also be connected to the secondary winding in one aspect.

Other objects and advantages of the invention will become apparent upon reading the following detailed description and upon reference to the drawings, in which:

BRIEF DESCRIPTION OF THE DRAWINGS

The FIGURE is a block circuit diagram of a circuit arrangement that is provided for powering electrical loads in an area at risk of explosions.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

The following description of the figures explains aspects to enable a better understanding the invention. A person skilled in the art can take additional details that are not described from the circuit diagram in a usual way, wherein this supplements the description of the FIGURE in this respect. It is clear that a series of modifications to the circuit are possible.

A person skilled in the art can easily perform the exact dimensioning of the individual components with reference to the given functional explanation. Moreover, the circuit diagram is simplified and shows only elements that are required for understanding the invention.

The sole FIGURE of the drawing shows the circuit diagram of the circuit arrangement according to the invention. The FIGURE shows the block circuit diagram of a circuit arrangement that is provided for powering electrical loads in an area at risk of explosions. Examples for such applications are bus systems. Here, a relatively high current flows for a relatively low voltage. For safety reasons, it must be ensured that the current may not assume impermissibly high values on the power-supply line led into the area at risk of explosions, even if a load fails and would draw a current that is too high. On the other hand, the devices also may not be put at the risk of too high a feed voltage being generated due to a loss of a load on the secondary side.

Normally, these boundary conditions are managed by the internal control system. In the case of the circuit arrangement as shown in the FIGURE, additional redundancy is also provided that intervenes if the normal control should fail.

The circuit arrangement has two input terminals 1 and 2 that together form a power-supply input 3. The electrical energy is output on output terminals 4 and 5 that together represent a power-supply output 6. The power-supply input 3 is isolated galvanically from the power-supply output 6 by means of a transformer 7 that includes a primary winding 8 and a secondary winding 9. The required alternating voltage or the required alternating current through the primary winding 8 is generated with the help of a MOSFET 11. No free-running diode is connected in parallel to the primary winding 8.

A redundant voltage limiting circuit 12, as well as a current limiting circuit 13, is connected to the primary winding 8. The redundancy explained above is attained with both circuit arrangements. In addition, an oscillator 14 is present.

The primary winding 8 and the MOSFET 11 form a series circuit that is connected in parallel to the inputs 1 and 2. Here, the source lies on the input terminal 2 and the drain is connected to the primary winding. The MOSFET 11 provides a gate 15. By means of a protective resistor 16, the gate 15 lies on the oscillator 14 in the form of an astable, regulated multivibrator with variable pulse cycle. The secondary winding 9 whose sense of winding is designated with dots opposite the primary winding 8 is connected to a half-wave rectifier circuit. This comprises a rectifier diode 17 that connects one end of the secondary winding 9 to a filter capacitor 18 whose other connection leads back to the secondary winding 9.

The filter capacitor 18 thus lies parallel to the two output terminals 4 and 5 to which the load is connected. As can be seen, the rectifier arrangement involves a half-wave rectifier arrangement. The MOSFET 11 is operated so that, as a whole, a blocking-oscillator-type converter circuit is produced, i.e., the energy transfer within the transformer 7 occurs during the power-off phase of the MOSFET 11.

The circuit arrangement operates in a controlled way in that the pulse cycle with which the MOSFET 11 is controlled is re-adjusted accordingly. The voltage monitoring circuit 12 has the purpose of ensuring that the output voltage of the secondary winding 9 is forcibly limited independent of the normally active control. The voltage limiting circuit 12 contains a storage capacitor 19 that is connected in parallel to the primary winding 8 via a decoupling diode 21. The arrangement is made so that the anode of the diode 21 is connected to the drain of the MOSFET 11, while the capacitor 19 is connected to the terminal 1 with its end facing away from the diode 21.

A series circuit made from two ohmic resistors 22 and 23 lies parallel to the capacitor 19. In addition, a bipolar PNP transistor 24 and also a bipolar NPN transistor 25 belong to the voltage limiting circuit 12. With its emitter, the transistor 24 contacts the cathode of the diode 21, while the collector is connected via a resistor 26 to the circuit ground 2 and a Z-diode 27 is connected to the base of the transistor 25. With its main section terminals, a shunt regulator 28 lies between the base of the transistor 24 and the hot end of the primary winding 8 or the input terminal 1. The control terminal of the shunt regulator 28 is connected to the node between the two ohmic resistors 22 and 23. In this way, the two resistors 22 and 23 define the switching threshold above which the shunt regulator 28 becomes conductive.

With its collector, the transistor 25 is finally connected to the gate 15, while the emitter lies on the source of the MOSFET 11 or the input terminal 2. The current limiting device 13 comprises a capacitor 28 that lies parallel to the power section of the MOSFET 11, i.e., the capacitor 29 lies, on one end, on the source and, on the other end, on the drain. Furthermore, an RC element consisting of a resistor 30 and a capacitor 31 is connected in parallel to the capacitor 28.

The control section of a bipolar PNP transistor 32 whose emitter is connected to the drain of the MOSFET 11 lies parallel to the resistor 30. A thyristor 33 whose control terminal is connected to the collector of the transistor 32 is controlled by means of the collector of the transistor 32. The anode of the thyristor 33 lies on the gate 15 and the cathode is connected to the source of the MOSFET 11. The thyristor 33 thus lies parallel to the power section of the MOSFET 11.

The circuit described in this respect works as follows. In normal operation, the control circuit for the MOSFET 11 ensures that this is charged with a square pulse by means of which the MOSFET 11 is periodically switched on and off via the gate 14. In the conductive state, the MOSFET 11 generates a current through the primary winding 8. In the power-off state, the magnetic energy stored in the primary winding 8 during the conductive phase of the MOSFET 11 is transmitted to the secondary winding 9, so that the connected load is supplied with current.

By varying the pulse cycle of the pulse led into the gate 15, it is ensured that the voltage across the filter capacitor 18 is held constant for a given or variable load on the output terminal 6. During the free-running phase, i.e., when the MOSFET 11 is switched off, the current through the primary winding 8 and the voltage appearing there reflect the current and voltage situation on the secondary winding 9.

In normal operation, during the free-running phase a voltage is produced on the primary winding 8 and this voltage results in that the filter capacitor 19 that acts as an integrator is charged by means of the diode 21. The voltage produced on the capacitor 19 is stepped down by means of the divider resistors 22, 23 to a corresponding value, like that given from the following function description. In normal operation, the voltage is sufficiently high so that the shunt regulator 28 becomes conductive and thus generates a base current for the transistor 24. The transistor 24 controlled in this way generates a voltage drop on the resistor 26 and this voltage drop is a mapping of the voltage on the secondary side of the transformer 7. In normal operation, the Z-diode 27 remains blocked. Only if the voltage should become too high due to interference on the secondary side and interference of the oscillator 14 and if the switching threshold of the Z-diode 27 is exceeded, then a base current for the transistor 25 is also generated. The transistor 25 is turned on and the gate 15 of the MOSFET 11 short-circuits to ground. The MOSFET 11 is thus blocked. The blocking state remains until the voltage on the capacitor 19 together with the voltage on the input terminals 1, 2 reaches a value that is less than the threshold value of the Z-diode 27.

As can be seen from the drawing, the switching on of the transistor 24 is independent of the input voltage on the terminals 1, 2. The conductive state of the transistor 24 is regulated exclusively by means of the voltage on the integration capacitor 19 connected to the shunt regulator 28. However, the input voltage is incorporated into the control voltage for the transistor 25.

If no control voltage for the oscillator 14 is to be derived from the current that the transistor 24 delivers, the Z-diode 27 can be eliminated and the divider resistors 22, 23 are dimensioned so that the shunt regulator 28 opens only when the threshold for the permissible voltage on the primary winding 9 is exceeded, which corresponds to a corresponding overvoltage on the secondary winding 8 in the free-running state.

After a specified time that is ultimately given from the time constant that the capacitor 19 produces in connection with the two resistors 22, 23, as well as the collector current of the transistor 24, the voltage drops below the threshold voltage of the Z-diode 27 and the transistor 25 transitions into the blocking state, so that clock pulses can be led into the MOSFET 11 again. The blocking oscillator resumes its function. If the overvoltage should appear again, the just explained interplay is repeated.

For correspondingly smaller time constants of the control side of the transistor 24, this intervention can also disappear within a pulse with which the MOSFET 11 is switched to the conductive state. In this case, the astable multivibrator 14 with which the input signal for the MOSFET 11 is generated can have a constant frequency and a constant pulse cycle. The pulse length is then ultimately set by the voltage limiting circuit 12, in that the incoming pulse is periodically suppressed by means of the voltage limiting circuit 12.

As already indicated above, during the blocking phase, the profile of the voltage on the primary winding represents a measure for the current flowing on the secondary side. During the switch-on phase of the current through the primary winding 8, magnetic energy is fed into the transformer 7. The fed energy is proportional to the inductance of the primary winding and the time period over which the MOSFET 11 is turned on.

During the switch-off phase, the energy is transmitted into the secondary coil, wherein the current that the secondary coil outputs to the load exhibits a characteristic time profile during the free-running time in connection with the capacitor 28 lying in series. The larger the current is, the larger the end-of-charging voltage becomes on the capacitor 28 before the MOSFET 11 transitions back into the conductive state. If an excess current drain appears, the voltage on the capacitor 28 will become so large that it is larger than the base-emitter voltage of the transistor 32 plus the voltage on the control section of the thyristor 33. Therefore, the transistor 32 will conduct and thus also the thyristor 33. Because the thyristor 33 lies parallel to the control section of the field-effect transistor 11, the gate 15 here short-circuits to the source and switches off the transistor 11. In this way, the possibility is given to the MOSFET 11 of switching on the current through the primary winding 8 again.

The resistor 29 works, incidentally, in connection with the capacitor 31 as a low-pass filter, in order to form an average value of the profile of the voltage appearing on the capacitor 28, because this is immediately and abruptly discharged when the MOSFET 11 is switched on. The oscillator 14 works as an astable multivibrator that is voltage-controlled. As an active assembly, it contains a differential amplifier 35 with an inverting input and a non-inverting input. The non-inverting input is connected by means of a reaction coupling resistor 36 to the output of the differential amplifier 35, in order to generate Schmitt trigger response.

A negative feedback resistor 37 connects the output to the inverting input that is further connected, incidentally, by means of a filter capacitor 38 to the circuit ground corresponding to the terminal 2. The output of the differential amplifier 35 is connected to the gate 15 of the MOSFET 11. The oscillator 14 receives the control voltage in that the non-inverting input of the differential amplifier 35 is connected via a resistor 39 to the collector of the transistor 24.

The voltage on the resistor 39, where it is connected to the collector of the transistor 24, thus corresponds to the sum of the voltages applied to the input 3 plus the voltage on the capacitor 19. The function of such an astable multivibrator 14 is known to those of skill in the art and therefore will be explained only as a whole. In the oscillating state, when the differential amplifier 35 is turned on, the capacitor 38 is charged via the resistor 37. As soon as this voltage above the control voltage is applied to the non-inverting input, the differential amplifier 35 is turned off, which produces Schmitt trigger characteristics with the help of the resistor 36. When the differential amplifier 35 is turned off, the capacitor 38 is discharged from the output of the differential amplifier 35 via the resistor 37. The input-output voltage switches on again as soon as the voltage on the capacitor 38 has dropped far enough. This series if events repeats itself periodically.

Because the integration element made from the resistor 37 and the capacitor 38 is constant, the pulse cycle changes according to the input voltage applied to the non-inverting input. It will be appreciated that the oscillator 14 that controls the power semiconductor, in order to periodically turn on and off the primary current into the transformer 7, is driven with the help of an oscillator 14 that likewise receives its control voltage from the primary winding 8. Thus a third winding on the transformer 7 can be eliminated, in order to control the blocking oscillator by means of such a reaction coupling winding, as is sufficiently well known from the prior art. In the case of the blocking oscillator according to the invention, the control voltage is derived directly from the voltage.

The circuit explained herein according to the invention contains, as a whole, three units in the form of the voltage monitoring device 12, the current monitoring device 13, and the astable multivibrator 14. These units are independent of each other in so far as the circuit could be constructed only with the oscillator 14 without the current monitoring device 13 and without the voltage monitoring device 12.

Alternatively, the oscillator 14 may be replaced by an oscillator that works with a reaction coupling winding on the transformer 7. On such an oscillator circuit, the voltage monitoring circuit 12 and/or the current monitoring circuit 13 can be used independently of each other. The determination as to which of these circuits to use may be made based on the desired degree of safety.

A blocking-oscillator-type converter circuit works with a transformer that has only one primary winding and one secondary winding. The transformer contains no reaction coupling winding for the blocking oscillator.

The control voltage for the oscillator is derived from the primary voltage of the transformer, that is, during the free-running phase. Furthermore, a voltage monitoring circuit is provided that works independent of the oscillator, suppressing the output voltage of the oscillator when the voltage on the output of the blocking-oscillator-type converter becomes too large.

A current monitoring circuit works independent of the oscillator and the voltage monitoring circuit and suppresses the pulses for the power transistor when the current on the output side exceeds a specified amount. The monitoring circuits work practically without power, so that no special cooling measures are required.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. For example, the illustrated calibration steps may optionally be executed in reverse order, and other alternative orders and steps may be practicable where logically appropriate without departing from the described principles.

The invention claimed is:

1. A power-supply arrangement an explosion-proof configuration and galvanic isolation comprising:
a power-supply input,
a transformer that has a primary winding and a secondary winding separated galvanically from this primary winding,
a controlled semiconductor switch that has at least one control input and that forms, with the primary winding, a series circuit that lies parallel to the power-supply input,
a controllable control circuit for the semiconductor switch that delivers, for the semiconductor switch, a periodic control signal that is controlled such that the output voltage on the secondary winding and/or the current through this winding corresponds to a specified desired value, and
a current limiting device that has a capacitor lying parallel to the semiconductor switch and a voltage monitoring circuit that lies parallel, on the input side, to the capacitor and whose output signal acts on the switch state of the semiconductor switch such that the semiconductor switch is moved to a stationary state in which it generates no alternating current through the primary winding when the voltage on the capacitor exceeds a predetermined limiting value.

2. The power-supply arrangement according to claim 1, wherein the primary winding has a higher or lower number of turns than the secondary winding.

3. The power-supply arrangement according to claim 1, wherein the semiconductor switch is formed by a MOSFET.

4. The power-supply arrangement according to claim 1, wherein the controllable control circuit has an astable multivibrator.

5. The power-supply arrangement according to claim 4, wherein the frequency of the astable multivibrator is fixed and the pulse cycle is variable.

6. The power-supply arrangement according to claim 4, wherein the oscillation frequency of the astable multivibrator is variable and the switch-on time is constant.

7. The power-supply arrangement according to claim 1, wherein the current limiting circuit has a low-pass filter that lies parallel to the capacitor.

8. The power-supply arrangement according to claim 7, wherein the low-pass filter contains a capacitor to which a resistor is connected in series, wherein this resistor is connected to the primary winding.

9. The power-supply arrangement according to claim 8, wherein the control section of a bipolar transistor is connected parallel to the resistor.

10. The power-supply arrangement according to claim 9, wherein the current limiting circuit contains a thyristor whose control input is connected to the collector of the control transistor and whose operating section is connected parallel to the control section of the semiconductor switch.

11. The power-supply arrangement according to claim 9, wherein the current limiting circuit contains an electronic circuit with a switching response.

12. The power-supply arrangement according to claim 1, wherein it is configured to operate as a blocking-oscillator-type converter.

13. The power-supply arrangement according to claim 1, wherein a half-wave rectifier circuit is connected to the secondary winding.

* * * * *